United States Patent
Ueda et al.

(10) Patent No.: US 7,038,983 B2
(45) Date of Patent: May 2, 2006

(54) DATA REPRODUCTION APPARATUS HAVING A VARIABLE SYNCHRONIZATION DETECTION WINDOW

(75) Inventors: Yasushi Ueda, Saijo (JP); Toru Aoki, Saijo (JP); Makoto Okazaki, Niihama (JP); Nobuaki Noguchi, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 795 days.

(21) Appl. No.: 09/980,202

(22) PCT Filed: Mar. 27, 2001

(86) PCT No.: PCT/JP01/02456

§ 371 (c)(1),
(2), (4) Date: Mar. 11, 2002

(87) PCT Pub. No.: WO01/73785

PCT Pub. Date: Oct. 4, 2001

(65) Prior Publication Data

US 2003/0018931 A1    Jan. 23, 2003

(30) Foreign Application Priority Data

Mar. 28, 2000    (JP)    ............................. 2000-089686

(51) Int. Cl.
*G11B 7/00*    (2006.01)
(52) U.S. Cl. .................. 369/53.15; 369/47.28
(58) Field of Classification Search ............. 369/53.16, 369/47.28, 53.15
See application file for complete search history.

(56) References Cited

U.S. PATENT DOCUMENTS

| | | | | | |
|---|---|---|---|---|---|
| 4,791,622 | A | * | 12/1988 | Clay et al. | ................ 369/59.26 |
| 5,274,676 | A | * | 12/1993 | Gose et al. | ................. 375/354 |
| 6,005,731 | A | * | 12/1999 | Foland et al. | .................. 360/53 |
| 6,154,866 | A | | 11/2000 | Kawahara et al. | |
| 6,181,497 | B1 | * | 1/2001 | Malone, Sr. | ................. 360/48 |

FOREIGN PATENT DOCUMENTS

JP    58-098812    6/1983

(Continued)

OTHER PUBLICATIONS

Japanese search report for PCT/JP01/02456 dated Jun. 28, 2001.

(Continued)

*Primary Examiner*—Gautam R. Patel
(74) *Attorney, Agent, or Firm*—RatnerPrestia

(57) ABSTRACT

A fast synchronization pull-in and an optimum error correction are achieved in a reproduction apparatus for reproducing data recorded on a recording medium even in the case where the quality of input data involving a seek or defect is low. A seek amount detection block 190 is provided, a seek change signal 201 is generated, and the width of a synchronization detection window pulse 161 and a correction algorithm in a correction block 230 are modified.

7 Claims, 4 Drawing Sheets

FOREIGN PATENT DOCUMENTS

| | | |
|---|---|---|
| JP | 1-100774 | 9/1989 |
| JP | 1-245461 | 9/1989 |
| JP | 6-020390 | 1/1994 |
| JP | 7-093755 | 4/1995 |
| JP | 7-153202 | 6/1995 |
| JP | 8-124300 | 5/1996 |
| JP | 08124300 A * | 5/1996 |
| JP | 11-273072 | 10/1999 |
| WO | 98/14940 | 4/1998 |

OTHER PUBLICATIONS

English translation of Form PCT/ISA/210.

* cited by examiner

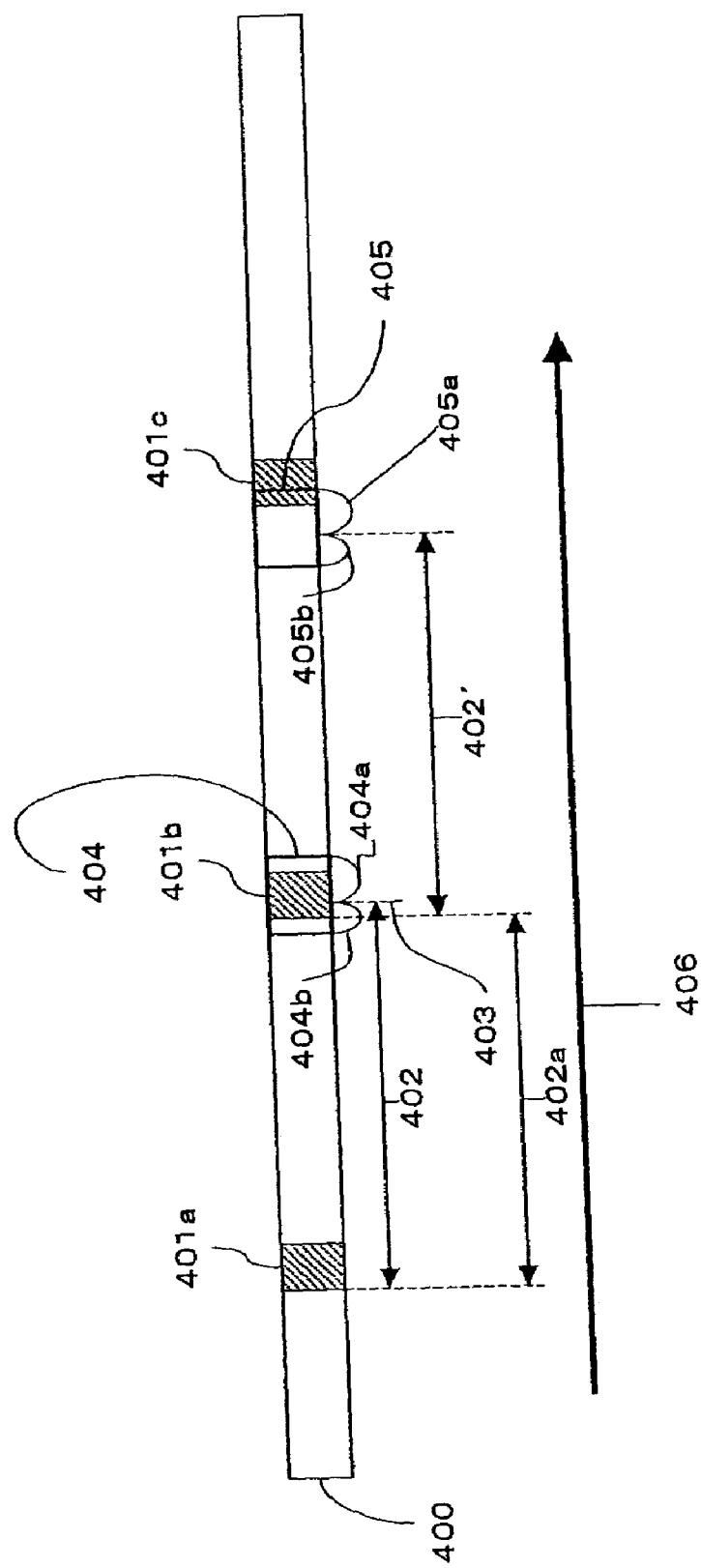

US 7,038,983 B2

DATA REPRODUCTION APPARATUS HAVING A VARIABLE SYNCHRONIZATION DETECTION WINDOW

This application is a U.S. National Phase application of PCT International application PCT/JP01456, filed Mar. 27, 2001.

TECHNICAL FIELD

The present invention relates to a data reproduction apparatus and method for reading signals recorded on a recording medium and outputting error-corrected data.

BACKGROUND ART

A receiving apparatus in data transmission, for example an apparatus for reproducing data from a recording medium such as an optical disk or magnetic disk detects a synchronization patterns that are inserted in an input data stream at regular intervals in input data provided through a transmission line or obtained by reproducing the recording medium to perform so-called "pull-in", reproduces a clock from the input data, and uses the clock to reproduce data.

A PLL (Phase Locked Loop) circuit is typically used to reproduce the clock. The PLL circuit detects a phase difference between an output (clock) from an "local oscillator" and input data and performs a control through a feedback loop so that the frequency and phase of the output from the local oscillator matches the frequency and phase of the input data to reproduce the clock. The clock is used for the above-mentioned "pull-in".

A synchronization pattern error often occurs in data read from a recording medium during transmitting the data to the external through a transmission line, or a part of the data often erroneously match a synchronization pattern. As a result, a synchronization detection error occurs in which the synchronization pattern cannot be detected, or an erroneous synchronization occurs in which a pattern occurring in the data is erroneously found as a synchronization pattern.

For such faults, as means of preventing a synchronization detection error, interpolation is known which estimates the position of a synchronization pattern to be detected based on the previous position where the synchronization pattern is detected and inserts a dummy synchronization-detection signal into the estimated position.

Windowing is also known as means of preventing a synchronization detection error which, based on intervals between synchronization patterns, estimates a position in an input data stream where the next synchronization pattern would be inserted and provides a window having a predetermined width to detect a synchronization pattern in an input data stream within the window.

An operation for reproducing data from a recording medium and windowing will be described below with reference to FIG. 4. When the first synchronization pattern 401a is detected in data stream 400 reproduced in a read direction 406 from a recording medium, a reproduction apparatus counts data in the reproduction data stream 400 based on predetermined synchronization pattern insertion intervals 402 to detect the next synchronization pattern 401b.

If all of the reproduction data 400 is correctly read, the synchronization pattern 401b can be detected by counting the synchronization pattern insertion intervals 402. However, it is difficult in practice to detect the synchronization pattern only by strictly counting the insertion intervals because missing data, an error in synchronization patterns, or an error in the data stream may occur on the transmission line.

Therefore, a window 404 having a predetermined width forward and backward (width 404b forward and width 404a backward) from a position 403 identified based on the insertion intervals 402 in the reproduction data stream 400 is provided and the synchronization pattern 401b is detected within the window 404. Assuming that the width of a synchronization pattern is 2 bytes and the width of the data stream is 91 bytes in the example shown in FIG. 4, the insertion interval will be 93. If the width of a window with respect to this insertion interval is set as one byte, with width 404a being 0.5 bytes and width 404b being 0.5 bytes with a synchronization pattern identification position 403 in between, synchronization pattern 401b can be detected by searching for it in window 404 because synchronization pattern 401b is contained within window 404 even if interval 402a between synchronization pattern 401a and synchronization pattern 401b on a transmission line in practice is 92.5 bytes and synchronization pattern 401b is at a position short of the count of insertion interval 402.

As an approach to provide higher reliability of data processing systems, error correction means that decodes an error correction signal capable of correcting a data error is used in various data reproduction apparatuses. In recent years, the probability of errors in data read from a recording medium has increased because of higher recording densities on recording media and higher rates of data transfer to data processing apparatuses.

Therefore, a number of codes having a high error correction capability are added or iterative decoding in which a plurality of error correction codes are repeatedly decoded is performed in the error correction means. For example, an error correction code is added for CD-ROMs in addition to an error correction code called CIRC for music CDs and iterative decoding in which a plurality of (more than one) correction processes, each of which uses an error correction code, are combined in predetermined order is applied to the doubly added error correction code. The iterative decoding is also applied to a product code in DVD-ROM and DVD-RAM.

When data is read from a recording medium and transferred to a data processing apparatus, it is required that processing such as decoding, error correction, and data transfer is performed without delaying the data read. Therefore, an iterative correction for performing correction certain times in a certain order is used for DVD-ROM, which allows the error correction to end within a predetermined time.

In any of the examples of the prior art described above, in any reproduction process, correction of erroneous synchronization and data error correction are performed according to a particular error correction algorithm in which the width of a window, the number of times error corrections is performed, and the order in which the error corrections are performed are fixed.

However, in these prior-art examples, if pull-in is performed again after a PLL is unlocked because a seek is involved or a defect (flaw or soil) is detected on a recording medium during the reproduction of the recording medium, a clock becomes unstable immediately after the re-pull-in.

Because insertion intervals are counted based on a clock in a windowing operation and therefore not correctly counted immediately after the PLL pull-in, the position at which a window is set may shift from the position at which it would be set during normal operation If windowing is performed in such a case, a correct synchronization pattern may not be able to be detected by using the width of a window according to the prior art. If synchronization pattern 401c were to be detected based on the first synchronization pattern 401b detected immediately after a seek operation in the example shown in FIG. 4, insertion interval 402' would be shorter than a normal interval and window 405 is set at a position short of its normal set position because the clock is unstable.

In this case, because width 405a of window 405 is so small that a part of the synchronization pattern 401 cannot fit into window 405, synchronization pattern 401 cannot be detected by searching within window 405.

Furthermore, especially if there is a defect on the disk, no input data is provided on the transmission line during the presence of the defect even though the PLL is not unlocked, that is, no pull-in is performed, therefore the feedback operation of the PLL suspends and, while the feedback operation is under suspension, the a fixed clock is kept based on the previous data provided immediately before the data input is stopped by the defect whereby insertion intervals can be counted.

Consequently, a window pulse set position would shift from a position where it would otherwise be set, as in the case of a pull-in of the PLL. If the shift causes a data stream of a synchronization pattern to be excluded from the window, the synchronization pattern cannot be detected.

A clock may become unstable on the boundary between a land and a groove during the reproduction of data from a DVD-ROM or DVD-RAM and, as a result, it may become difficult to read data from it, or the optimum width of a window for a land may differ from that for a groove. If a window width is set to suit one of the land and groove, a proper synchronization pattern may be unable to be detected during the reproduction of data from the other.

To avoid these problems, the width (such as 404a, 405a, 404b, and 405b in FIG. 4) of the window may be made sufficiently wide to allow for the instability of the clock during a re-pull-in of PLL and a decrease in the accuracy of an insertion interval count caused by a fixed clock due to the suspension of the PLL caused by the occurrence of a defect. However, too wide a window may increase the likelihood that an erroneous detection of a synchronization pattern will occur during a normal operation.

There is a problem even in a case where a synchronization pattern can be correctly detected under the above described circumstances, that the reliability of read data may often be reduced and it is likely that the data cannot be corrected by a certain error correction algorithm based on a given repetitive process in which the number of times and order of error corrections are fixed and therefore the data recorded on an optical disk cannot be reproduced in its original, correct format.

To avoid this problem, an error correction algorithm having a higher correction capability or an algorithm in which the number of repetitions is increased may be used. However, even though the capability of error correction may increase, there is a problem that the algorithm will also increase processing time in normal operation and, consequently, delay a data read or increase power consumption.

DISCLOSURE OF THE INVENTION

The present invention solves these problems with the prior art and it is an object of the present invention to provide a data reproduction apparatus and method capable of reproducing data in its original, correct format by performing synchronization detection at a correct position or using an optimum error correction algorithm, even in the case where a seek is involved or a defect is detected.

To achieve the above object, one aspect of the present invention is a data reproduction apparatus comprising:

reproduction means of reproducing data recorded on a recording medium;

data error correction means of performing error correction processing on the data reproduced from said recording medium based on a predetermined algorithm; and seek length detection means of monitoring a seek length when the data is reproduced from said recording medium;

wherein said data error correction means modifies said predetermined algorithm according to said seek length Another aspect of the present invention is the present invention described above, wherein:

said seek length detection means comprises a rewritable register and modifies the error correction algorithm by comparing a predetermined set value set in said register with said seek length.

The present invention described above increases the possibility that data is reproduced in its original, correct format by performing error correction, even in the case where the reliability of the data decreases after a seek.

Still another aspect of the present invention is a data reproduction apparatus comprising:

reproduction means of reproducing data recorded on a recording medium;

clock count means of counting clocks based on data reproduced from said recording medium;

window generation means of estimating the position of a synchronization signal in said reproduced data based on the count value of said clocks and generating a synchronization detection window signal having a predetermined width including the estimated position;

synchronization signal detection means of detecting the synchronization signal from the data reproduced from said recording medium by searching within said synchronization detection window; and seek length detection means of monitoring a seek length when the data is reproduced from said recording medium;

wherein said window generation means changes the width of said synchronization detection window signal for a predetermined period of time according to said monitored seek length.

Yet still another aspect of the present invention is the present invention described above, wherein said synchronization signal detection means changes criteria for detecting said synchronization signal according to said monitored seek length.

Still yet another aspect of the present invention is the present invention described above, wherein said seek length detection means comprises a rewritable register and said window generation means changes the width of said synchronization detection window signal by comparing a predetermined set value set in said register with said seek length.

A further aspect of the present invention is the present invention described above, wherein said predetermined period of time during which the width of said synchronization detection window signal is changed is a time period from the completion of said seek operation to the time when said synchronization signal is detected with stability.

A still further aspect of the present invention is the present invention mentioned above, wherein said predetermined period of time during which the width of said synchronization detection window signal is changed is associated with said seek length.

A yet further aspect of the present invention is the present invention described above, wherein the quantity of change in the width of said synchronization detection window signal is associated with said seek length.

The present invention described above increases the possibility that a correct synchronization pattern can be detected with stability even in the case where the reliability of data decreases after a seek.

A still yet further aspect of the present invention is a data reproduction apparatus comprising:

reproduction means of reproducing data recorded on a recording medium;

data error correction means of performing error correction processing on the data reproduced from said recording medium based on a predetermined algorithm; and defect detection means of detecting a defect on said recording medium;

wherein said data error correction means modifies said predetermined algorithm for a period of time during which said defect is detected.

An additional aspect of the present invention is the present invention described above, wherein said defect detection means determines the type and/or size of said defect and said error correction means modifies said predetermined algorithm to be modified according to said determined type and/or size of said defect.

The present invention described above increases the possibility that data can be reproduced in its original, correct format by performing error correction, even in the case where the reliability of the data decreases when a defect is detected.

A still additional aspect of the present invention is a data reproduction apparatus comprising:

reproduction means of reproducing data recorded in the recording medium;

clock count means of counting clocks based on the data reproduced from said recording medium;

window generation means of estimating the position of a synchronization signal in said reproduced data based on the count value of said clocks and generating a synchronization detection window signal having a predetermined width including the estimated position;

synchronization signal detection means of detecting the synchronization signal from the data reproduced from said recording medium by searching within said synchronization detection window; and defect detection means of detecting a defect on said recording medium based on the data reproduced from said recording medium;

wherein said window generation means changes the width of said synchronization detection window signal at least for a period of time during which said defect is detected.

A yet additional aspect of the present invention is the present invention described above, wherein said defect detection means determines the type and/or size of said defect and said window generation means changes the quantity of a change in the width of said synchronization detection window signal according to said determined type and/or size of said defect.

A still yet additional aspect of the present invention is the present invention described above, wherein said window generation means detects said defect, and if the width of said window signal is changed, continues to change the width of said synchronization detection window signal for a predetermined period of time after the detection of said defect ends.

A supplementary aspect of the present invention is the present invention described above, wherein said predetermined period of time is a time period from the completion of the detection of said defect to the time when said synchronization signal is detected with stability.

A still supplementary aspect of the present invention is the present invention described above, wherein said synchronization signal detection means changes said criteria for detecting said synchronization signal according to the detection of said defect.

The present invention described above increases the possibility that a correct synchronization pattern can be detected with stability even in the case where the reliability of data decreases when a defect is detected.

A yet supplementary aspect of the present invention is a data reproduction apparatus comprising:

reproduction means of reproducing data recorded on a recording medium on which a land track and a groove track are formed alternatively in a spiral or concentric fashion;

error correction means of performing error correction processing on the data reproduced from said recording medium based on a predetermined algorithm; and track determination means of determining at least whether said reproduced data is reproduced form said land track or said groove track;

wherein said data correction means modifies said predetermined algorithm according to the determination by said track determination means.

A still yet supplementary aspect of the present invention is a data reproduction apparatus comprising:

reproduction means of reproducing data recorded on a recording medium on which a land track and a groove track are formed alternatively in a spiral or concentric fashion;

clock count means of counting clocks based on data reproduced from said recording medium;

window generation means of estimating the position of a synchronization signal in said reproduced data based on the count value of said clocks and generating a synchronization detection window signal having a predetermined width including the estimated position;

synchronization signal detection means of detecting the synchronization signal from the data reproduced from said recording medium by searching within said synchronization detection window; and track determination means of determining at least whether said reproduced data is reproduced form said land track or said groove track;

wherein said window generation means changes the width of the synchronization detection window signal according to the determination of said track determination means.

Another aspect of the present invention is the present invention described above, wherein said synchronization signal detection means changes said criteria for detecting said synchronization signal according to the determination of said track determination means.

The present invention described above increases the possibility that a correct synchronization pattern can be detected with stability even in the case where the reliability of data decreases depending on the current position or a change of the current position.

Still another aspect of the present invention is the present invention described above, wherein said window generation means comprises a rewritable register and changes the width of said synchronization detection window signal by a width set in said register.

Yet still another aspect of the present invention is the present invention described above, wherein said seek length detection means uses an address detected in said storage medium to detect said seek length.

Still yet another aspect of the present invention is the present invention described above, wherein said defect detection means analyzes the envelope of an RF signal read from said storage medium to detect said defect.

A further aspect of the present invention is the present invention described above, wherein said track determination means uses the address detected from said storage medium to perform said determination.

A still further aspect of the present invention is a program for causing a computer to function as all or any of the reproduction means of reproducing data recorded on a recording medium, the data error correction means of performing error correction processing on the data reproduced from said recording medium based on a predetermined algorithm, and seek length detection means of monitoring a seek length when the data is reproduced from said recording medium of the data reproduction apparatus.

A yet further aspect of the present invention is a program for causing a computer to function as all or any of the reproduction means of reproducing data recorded on a recording medium, the clock count means of counting clocks based on data reproduced from said recording medium, window generation means of estimating the position of a synchronization signal in said reproduced data based on the count value of said clocks and generating a synchronization detection window signal having a predetermined width including the estimated position, the synchronization signal detection means of detecting the synchronization signal from the data reproduced from said recording medium by searching within said synchronization detection window; and the seek length detection means of monitoring a seek length when the data is reproduced from said recording medium of the data reproduction apparatus.

A still yet further aspect of the present invention is a program for causing a computer to function as all or any of the reproduction means of reproducing data recorded on a recording medium, the data error correction means of performing error correction processing on the data reproduced from said recording medium based on a predetermined algorithm, and the defect detection means of detecting a defect on said recording medium of the data reproduction apparatus.

An additional aspect of the present invention is a program for causing a computer to function as all or any of the clock count means of counting clocks based on the data reproduced from said recording medium, window generation means of estimating the position of a synchronization signal in said reproduced data based on the count value of said clocks and generating a synchronization detection window signal having a predetermined width including the estimated position, the synchronization signal detection means of detecting the synchronization signal from the data reproduced from said recording medium by searching within said synchronization detection window, the defect detection means of detecting a defect on said recording medium based on the data reproduced from said recording medium of the data reproduction apparatus.

A still additional aspect of the present invention is a program for causing a computer to function as all or any of the reproduction means of reproducing data recorded on a recording medium on which a land track and a groove track are formed alternatively in a spiral or concentric fashion, the error correction means of performing error correction processing on the data reproduced from said recording medium based on a predetermined algorithm, and the track determination means of determining at least whether said reproduced data is reproduced form said land track or said groove track of the data reproduction apparatus.

A yet additional aspect of the present invention is a program for causing a computer to function as all or any of the reproduction means of reproducing data recorded on a recording medium on which a land track and a groove track are formed alternatively in a spiral or concentric fashion, the clock count means of counting clocks based on data reproduced from said recording medium, the window generation means of estimating the position of a synchronization signal in said reproduced data based on the count value of said clocks and generating a synchronization detection window signal having a predetermined width including the estimated position, the synchronization signal detection means of detecting the synchronization signal from the data reproduced from said recording medium by searching within said synchronization detection window, and the track determination means of determining at least whether said reproduced data is reproduced form said land track or said groove track of the data reproduction apparatus.

BRIEF DESCRIPTION OF THE DRAWINGS

FIG. 4 is a schematic diagram for illustrating windowing in a data reproduction apparatus according to the prior art.

| | Description of Symbols |
|---|---|
| 110 | Optical disk |
| 111 | RF signal |
| 120 | Read channel block |
| 121 | Read data |
| 122 | Read clock |
| 130 | Defect detection block |
| 131 | Defect detection signal |
| 140 | Synchronization detection block |
| 141 | Synchronization pattern detection signal |
| 142 | Synchronization pattern setting register |
| 150 | Data demodulation block |
| 151 | Demodulated data |
| 160 | Window generation block |
| 161 | Window pulse |
| 170 | Width change setting register |
| 180 | Address detection block |
| 181 | Address information |
| 190 | Seek length detection block |
| 200 | Seek length setting register |
| 201 | Seek change signal |
| 210 | Current position determination block |
| 211 | Current position signal |
| 220 | Memory |
| 221 | Memory data bus |
| 222 | Transfer data |
| 230 | Error correction block |
| 240 | Data transfer block |
| 241 | Reproduced data |
| 400 | Reproduced data stream |
| 401a, 401b, 401c | Synchronization pattern |
| 402, 402' | Insertion interval |
| 403 | Identification position |
| 404, 405 | Window |

-continued

Description of Symbols

| 404a, 405a | Width of backward part of window |
| 404b, 405b | Width of forward part of window |

BEST MODE FOR CARRYING OUT THE INVENTION

Embodiment of the present invention will be described with reference to the accompanying drawings.

FIRST EMBODIMENT

Figure 1:
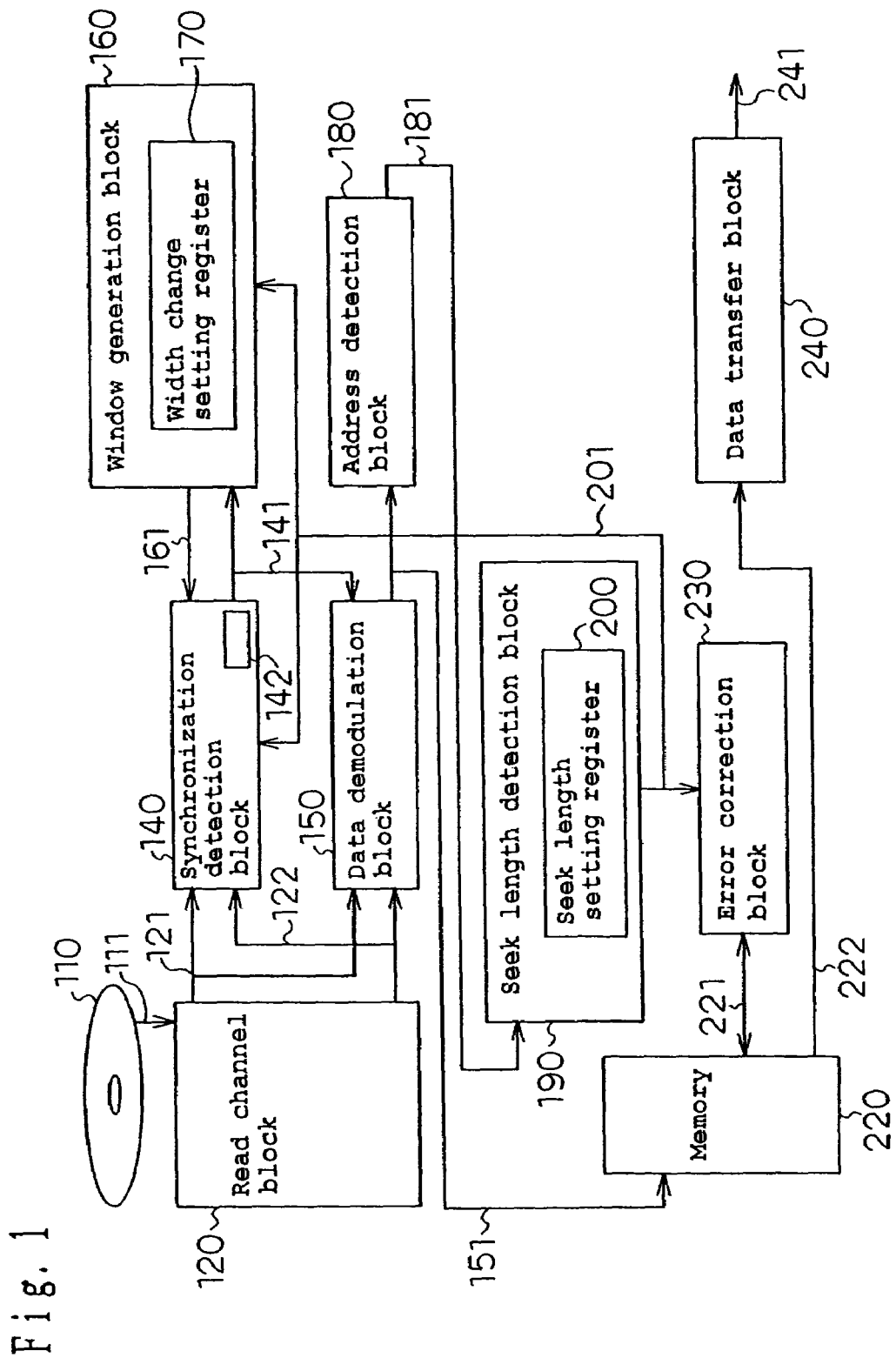
FIG. 1 is a block diagram showing signal processing by a data reproduction apparatus according to a first embodiment of the present invention.

A first embodiment of the present invention will be described with respect to FIG. 1. FIG. 1 is a block diagram showing signal processing by a data reproduction apparatus and method according to the present invention, in which an optical disk is used by way of example.

In FIG. 1, reference number 110 indicates an optical disk, 111 indicates an RF signal, 120 indicates read channel block, 121 indicates read data, 122 indicates read clock, 140 indicates synchronization detection block, 141 indicates synchronization pattern detection signal, 150 indicates data demodulation block, 151 indicate demodulated data, 160 indicates window generation block, 161 indicates a window pulse, 170 indicates a width change setting register, 180 indicates an address detection block, 181 indicates an address information, 190 indicates seek length detection block, 200 indicates seek length setting register, 201 indicates seek change signal, 220 indicates memory, 221 indicates memory data bus, 222 indicates transfer data, 230 indicate an error correction block, 240 indicates data transfer block, and 241 indicates reproduced data.

An operation by the data reproduction apparatus having the above-described configuration according to the present embodiment will be described below. RF signal 111 read from the optical disk 110 is input into the read channel block 120 and binarized. The binarized read data 121 and the read clock 122 is input into the synchronization detection block 140 and a synchronization pattern is detected from these.

Then the synchronization detection block 140, which detects the synchronization pattern, inputs a synchronization pattern detection signal 141 into the window generation block 160. The window generation block 160 estimates, based on the input synchronization pattern detection signal 141, a position where the next synchronization pattern would be inserted in a data stream read from the optical disk 110 and returns to the synchronization detection block 140 a window pulse 161 having a width preset in the data stream and centering around that position. Once the window pulse 161 is input, the synchronization detection block 140 performs synchronization detection within the window pulse 161. The synchronization detection block 140 also has the function of inserting a dummy synchronization-detection signal if it cannot detect a synchronization pattern within the window pulse 161, or judging out-of-synchronization and detecting a synchronization pattern irrespective of the window pulse 161 if it consecutively cannot detect synchronization pattern.

The data demodulation block 150 demodulates the read data 121 binarized by the read clock 122 into a predetermined format based on the synchronization detection signal 141. The demodulated data 151 is input into the address detection block 180, where address information 181 is extracted from the data 151.

The seek length detection block 190 calculates a seek length based on the extracted address information 181, and, if the calculated seek length exceeds a predetermined value, outputs a seek change signal 201. The seek length detection block 190 includes a seek length setting register 200, which can be set externally, and outputs the seek change signal 201 when it detects a seek length exceeding a value set in the register 200. The seek length is detected based on the extracted address information 181 in this embodiment. However, this embodiment is provided by way of example. The seek length can be detected by using a track-cross signal, which can be obtained from a servo block controlling a pick-up that reads data from the disk 110, or a tracking-off signal indicating an out-of-tracking.

When the window generation block 160 receives the seek change signal 201, it changes the width of window pulse 161 by a predetermined quantity and outputs the window pulse 161. It is desirable that the width of the window pulse 161 be changed to a width wider than the width before the reception of the seek change signal 201.

The window generation block 160 includes a width change setting register 170, which can be set externally, and the width of the window pulse 161 may be changed by a value set in the register 170. Alternatively, the width may be changed based on a seek length detected by the seek length detection block 190. For example, when the seek length is large, the width of the window pulse 161 may be changed to a width wider than that for a smaller seek length.

The window generation block 161, which receives the seek change signal 201, changes the width of the window pulse 161, then, after a predetermined time period elapses, restores the width of the pulse window 161 to its original width before the reception of the seek change signal 201, and then returns to normal operation. Here, the predetermined time period may be based on (for example, in proportion to) a seek length detected by the seek length detection block 190, it may be the number of times the synchronization detection block 140 has detected a synchronization pattern consecutively after the width of the window pulse 161 is changed, or it may be an amount of time set externally by using a register or the like.

The data 151 demodulated by data demodulation block 150 is stored in the memory 220. The error correction block 230 performs read error correction from the memory 220 through the memory data bus 221 and, if an error is found, it corrects data in the memory through memory data bus 221.

The seek change signal 201 is also input in the error correction block 230 and the error correction block 230 can use the seek change signal 201 to modify an error correction algorithm, that is, the number of times and/or order of error corrections, to perform error correction in accordance with the seek length. Here, the number of times and order of error corrections may be selected from a plurality of predetermined combinations based on the seek length.

Transfer data 222 which underwent the error correction is sent from the memory 220 to the data transfer block 240 and output as reproduced data 241 to the outside.

As described above, according to this embodiment, if the seek length exceeds a predetermined value during data reproduction that involves a seek, the width of a window pulse 161 is widened or an error correction algorithm is modified to ensure that a synchronization pattern is detected reliably and to enable stable data reproduction even in the case where the reliability of input data is low.

The seek change signal 201 may also be input into the synchronization detection block 140 and the synchronization detection block 140 may modify synchronization pattern detection criteria to detect a pattern resembling a real synchronization pattern as a synchronization pattern for a period in which the seek change signal 201 is being input. This allows the synchronization pattern detection operation to be continued, even if no synchronization pattern can be detected even with proper windowing because a portion of a synchronization pattern is lost or an error is contained in the synchronization pattern. The synchronization detection block 140 includes a synchronization detection pattern setting register 142, which can be set externally, and can also detect a pattern equals to a pattern set in the synchronization detection pattern setting register 142, as a synchronization pattern.

SECOND EMBODIMENT

Figure 2:
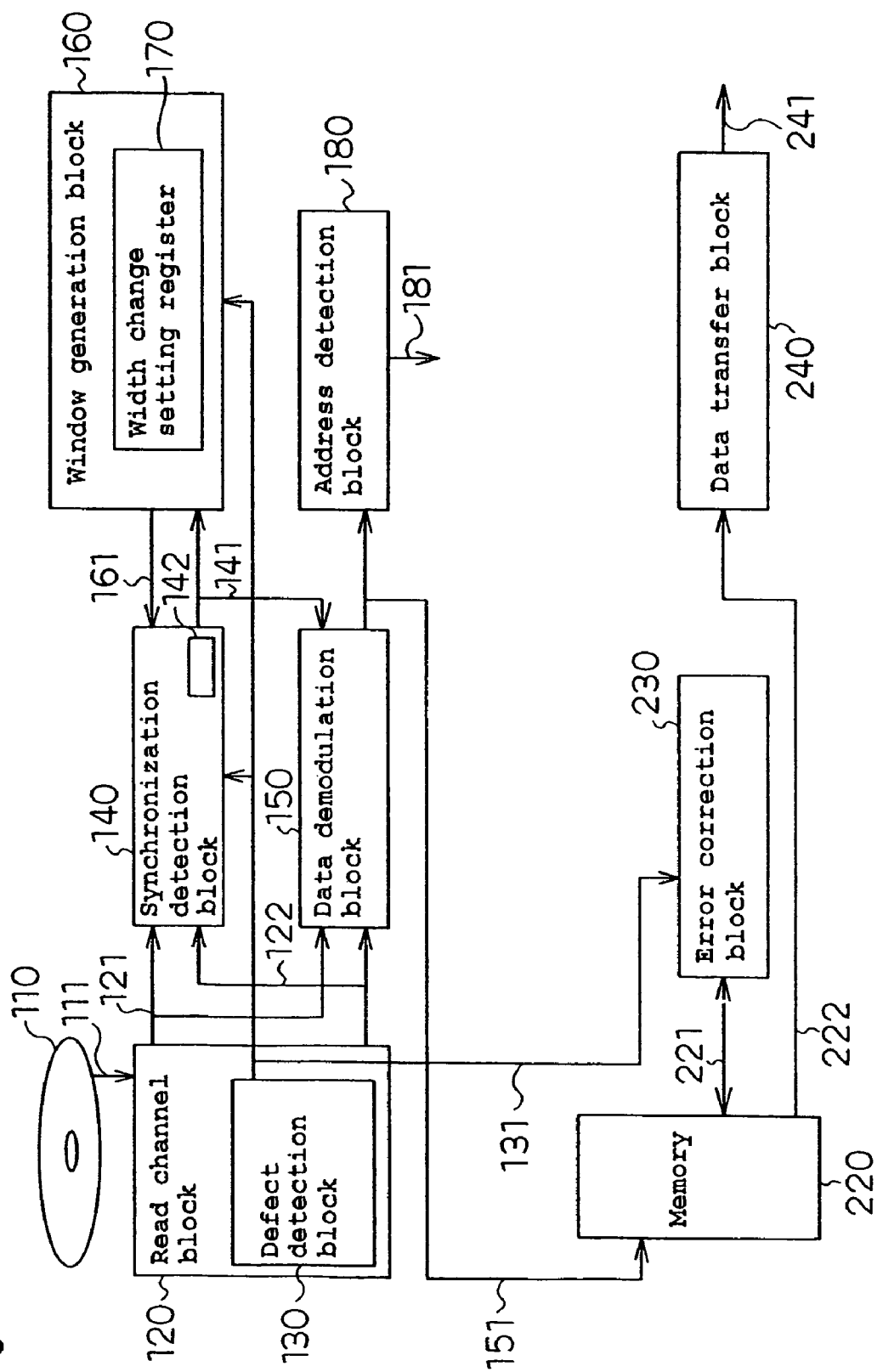
FIG. 2 is a block diagram showing signal processing by a data reproduction apparatus according to a second embodiment of the present invention.

A second embodiment of the present invention will be described below with reference to FIG. 2. FIG. 2 is a block diagram showing signal processing by a data reproduction apparatus according to the present invention, in which an optical disk is used by way of example. In FIG. 2, the same reference numbers as those in FIG. 1 indicate the same or equivalent components. Reference number 130 indicates a defect detection block.

An operation by the data reproduction apparatus having the above-described configuration according to the present embodiment will be described below.

An RF signal 111 read from an optical disk 110 is input into a read channel block 120 and binarized. In the read channel block 120, a defect detection block 130 observes the envelope of the RF signal 111 to detect a defect such as a BDO (Black Dot Out), scratch, or fingerprint and outputs a defect detection signal 131. The defect detection block 130 can also determine the type and size of the defect by observing the time and amplitude while the envelop is changing, add the type and size of the defect to the defect detection signal 131, and output them through a bus.

Binarized read data 121 and read clock 122 are input into a synchronization detection block 140 and a synchronization pattern is detected from them.

Then the synchronization detection block 140, which detects the synchronization pattern, inputs a synchronization pattern detection signal 141 into a window generation block 160. The window generation block 160 estimates, based on the input synchronization pattern detection signal 141, a position where the next synchronization pattern would be inserted in a data stream read from the optical disk 110 and returns a window pulse 161 having a width preset in the data stream and centering around that position to the synchronization detection block 140. Once the window pulse 161 is input, the synchronization detection block 140, it performs synchronization detection within the window pulse 161. The synchronization detection block 140 also has the function of inserting a dummy synchronization-detection signal if it cannot detect a synchronization pattern within the window pulse 161, or judging out-of-synchronization and detecting a synchronization pattern irrespective of the window pulse 161 if it consecutively cannot detect synchronization pattern.

When the window generation block 160 receives the defect detection signal 131 from the defect detection block 130, it changes the width of the window pulse 161 by a predetermined quantity based on the defect detection signal 131 regardless of the synchronization pattern detecting status in the synchronization detection block 140 as long as the defect detection signal 131 is being detected. It is desirable that the width of the window pulse 161 be changed to a width wider than the width before the reception of the defect detection signal 131. This can reduce conditions under which no synchronization pattern can be detected because of a defect and enables a faster synchronization pattern detection.

As with the first embodiment, the window generation block 160 includes a change width setting register 170 that can be set externally and the width of the window pulse 161 may be changed by a value set in the register 170.

Alternatively, the width of the window pulse may be changed based on the type of a defect output by the defect detection block 130. For example, if a defect is large, the width of the window pulse 161 may be changed by a larger quantity than a quantity for a smaller defect. If the defect is a large scratch or soil, a larger change in the width of window pulse 161 may be applied. If the defect is a small scratch or fingerprint, a smaller change in the width of window pulse 161 may be applied.

When the defect detection block 130 no longer detect a defect and stops outputting the defect detection signal 131, the window generation block 160 no longer receives the defect detection signal 131 and therefore restores the width of the pulse window 161 to its original width before the reception of the defect detection signal 131 and returns to normal operation.

If synchronization detection is performed again after out-of-synchronization occurs in the synchronization detection block 140 after the defect detection signal 131 is output because the defect being detected by the defect detection block 130 is large, then the window generation block 160 continues changing the width of the window pulse 161 for a predetermined time period even if it receives no other defect detection signal 131. The predetermined time period may be based on (for example, in proportion to) the size or the type of the defect detected by the defect detection block 130, or it may be based on the number of times the synchronization detection block 140 detects a synchronization pattern consecutively after the width of the window pulse 161 is changed. Alternatively, it may be an amount of time set externally using a register and the like.

Then a data demodulation block 150 demodulates the read data 121 binarized by a read clock 122 into a predetermined format based on the synchronization detection signal 141. The demodulated data 151 is input into an address detection block 180, where address information 181 is extracted from the data 151. The demodulated data 151 is also stored in memory 220.

An error correction block 230 performs read error correction from the memory 220 through the memory data bus 221 and, if an error is found, it corrects data in the memory through memory data bus 221.

The defect detection signal 131 is also input in the error correction block 230 and the error correction block 230 can use the defect detection signal 131 to modify an error correction algorithm, that is, the number of times and/or order of error corrections, to perform error correction in accordance with the seek length. Here, the number of times and order of error corrections may be selected from a plurality of predetermined combinations based on the size or type of the defect.

Transfer data 222 which underwent the error correction is sent from the memory 220 to the data transfer block 240 and output as reproduced data 241 to the outside.

As described above, according to this embodiment, an error correction algorithm is modified to allow a synchronization pattern to be detected reliably and to enable stable data reproduction even in the case where the reliability of input data is low in data reproduction that involves a storage medium having a defect.

In addition, because the width of a window pulse 161 is changed if a defect is detected during data reproduction, conditions under which no synchronization pattern can be detected can be reduced despite the defect.

The defect detection signal 131 may also be input into the synchronization detection block 140 and detection criteria in detecting a synchronization pattern can be modified to detect a pattern resembling a real synchronization pattern as a synchronization pattern for a period in which the defect detection signal 131 is being input. This allows the synchronization pattern detection operation to be continued even if a synchronization pattern cannot be detected despite proper windowing, because the portion of a synchronization pattern is lost or an error is contained in the synchronization pattern. The synchronization detection block 140 includes a synchronization detection pattern setting register 142, which can be set externally, and can also detect a pattern equal to a pattern set in the synchronization detection pattern setting register 142 as a synchronization pattern.

THIRD EMBODIMENT

Figure 3:
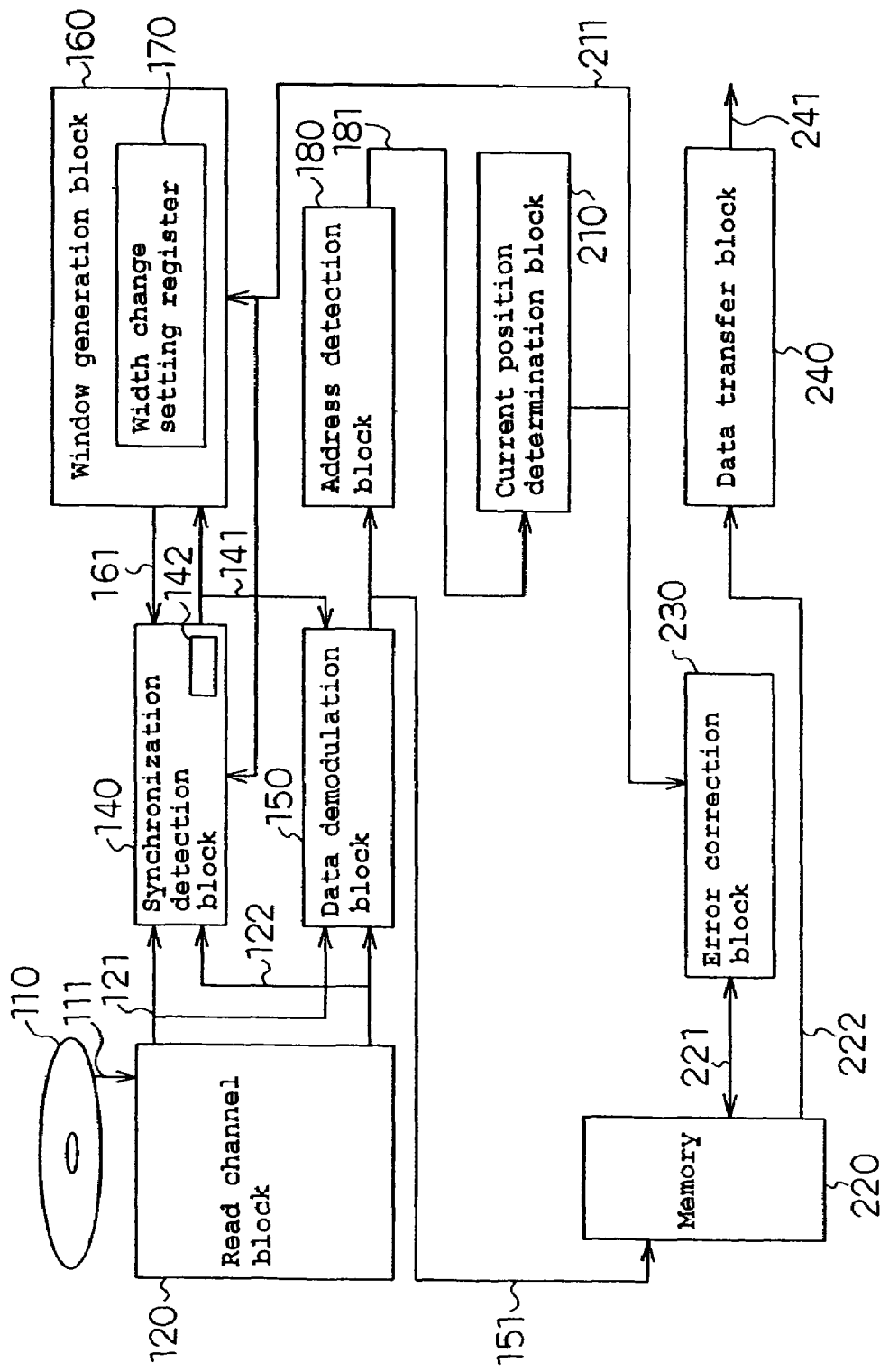
FIG. 3 is a block diagram showing signal processing by a data reproduction apparatus according to a third embodiment of the present invention.

A third embodiment of the present invention will be described below with reference to FIG. 3 FIG. 3 is a block diagram showing signal processing by a data reproduction apparatus according to the present invention, in which an optical disk is used by way of example. In FIG. 3, the same reference numbers as those in FIG. 1 indicate the same or equivalent components. Reference number 210 indicates a current position determination block.

An operation by the data reproduction apparatus having the above-described configuration according to the present embodiment will be described below.

An RF signal 111 read from an optical disk 110 is input into a read channel block 120 and binarized. The binarized read data 121 and read clock 122 are input into a synchronization detection block 140 and a synchronization pattern is detected from them.

Then the synchronization detection block 140, which detects the synchronization pattern, inputs a synchronization pattern detection signal 141 into a window generation block 160. The window generation block 160 estimates, based on the input synchronization pattern detection signal 141, a position where the next synchronization pattern would be inserted in a data stream read from the optical disk 110 and returns to the synchronization detection block 140 a window pulse 161 having a width preset in the data stream and centering around that position. Once the window pulse 161 is input, the synchronization detection block 140, it performs synchronization detection within the window pulse 161. The synchronization detection block 140 also has the function of inserting a dummy synchronization-detection signal if it cannot detect a synchronization pattern within the window pulse 161, or judging out-of-synchronization and detecting a synchronization pattern irrespective of the window pulse 161 if it consecutively cannot detect a synchronization pattern.

A data demodulation block 150 demodulates the read data 121 binarized by a read clock 122 into a predetermined format based on the synchronization pattern detection signal 141. The demodulated data 151 is input into an address detection block 180, where address information 181 is extracted from the data 151.

A current position determination block 210 calculates the current position (whether it is in a land track or groove track) from which data is detected based on the extracted address information 181 and outputs the result of the calculation as a current position signal 211. While in the present embodiment the current position is detected based on the extracted address information 181, this is one example and the current position can be detected by using a tracking error signal, for example.

Then the window generation block 160 receives the current position signal 211 from the current position determination block 210, changes the width of the window pulse 161 by a predetermined quantity based on the current position signal 211 and outputs it. It is desirable that the width of the window pulse 161 be changed to a width wider than the width before the reception of the current position signal 201. Also, the quantity of width change based on the determination by the current position determination block 210 may be larger in a groove track than in a land track and vice versa. Furthermore, the quantity of the width change may be changed according to the transition from a land track to a groove track or from a groove track to a land track.

As with the other embodiments, the window generation block 160 includes a change width setting register 170, which can be set externally, and the width of the window pulse 161 may be changed by a value set in the register 170.

The data 151 demodulated by data demodulation block 150 is also stored in memory 220. An error correction block 230 performs read error correction from the memory 220 through the memory data bus 221 and, if an error is found, it corrects data in the memory through memory data bus 221.

The current position signal 211 is also input into the error correction block 230 and the error correction block 230 can use the current position signal 211 to modify an error correction algorithm, that is, the number of times and/or order of error corrections, to perform error correction in accordance with the seek length. Here, the number of times and order of error corrections may be selected from a plurality of predetermined combinations based on the current position (whether it is in a land or groove), or whether a transition is from a land to a groove or from a groove to a land. Transfer data 222 which underwent the error correction is sent from the memory 220 to the data transfer block 240 and output as reproduced data 241 to the outside.

As described above, according to the present embodiment, the width of a window pulse 161 is widen or an error correction algorithm is modified according to the current position from which data is reproduced in a reproduction apparatus for reproducing data recorded on a recording medium on which a land track and a groove track are alternatively formed in a spiral or concentric fashion, thereby ensuring that a synchronization pattern is detected reliably and enabling stable data reproduction even in the case where the reliability of input data is low.

The current position signal 211 may also be input into the synchronization detection block 140 and the synchronization detection block 140 may modify synchronization pattern detection criteria to detect a pattern resembling a real synchronization pattern as a synchronization pattern for a period in which the current position signal 211 is being input when detecting the synchronization pattern. This allows the synchronization pattern detection operation to be continued even if no synchronization pattern can be detected despite proper windowing because a portion of a synchronization pattern is lost or an error is contained in the synchronization pattern. The synchronization detection block 140 includes a synchronization detection pattern setting register 142, which can be set externally, and can also detect a pattern equals to a pattern set in the synchronization detection pattern setting register 142 as a synchronization pattern.

The reproduction means and clock count means of the present invention represent the read channel block 120 in each embodiment, the data error correction means of the present invention represents the error correction block 230 in each embodiment, the seek length detection means of the present invention represents the seek length detection block 190 in each embodiment, the synchronization signal detection means of the present invention represents the synchronization detection block 140 in each embodiment, the window generation means of the present invention represents the window generation block 160 in each embodiment, defect detection means of the present invention represents the defect detection block 130 in each embodiment, and the track determination means of the present invention represents the current position determination block 210 in each embodiment. The synchronization signal of the present invention represents the synchronization pattern in each embodiment, the clock of the present invention represents the read clock 122 in each embodiment, and the synchronization detection window signal of the present invention represents the window pulse 161 in each embodiment.

While it is assumed in the forgoing description of the embodiments that the data reproduction apparatus of the present invention that modifies an error correction algorithm for data reproduced from a recording medium based on a seek length, defect, or the current position (whether it is in a land or groove) on the recording medium and the data reproduction apparatus of the present invention that changes the width of a window signal for detecting the intervals of data reproduced from the recording medium based a seek length, defect, or the current position on the recording medium (whether it is in a land or groove) are combined as one unit, the present invention may be embodied as one of these apparatuses alone. For example, the present invention may be configured without the error correction block 230 in the first to third embodiments. The present invention also includes a configuration of the first embodiment in which the window generation block 160 outputs a window pulse having a fixed width to the synchronization detection block 140 as the example of the conventional art whether or not the seek change signal 201 is input.

It is assumed that in the forgoing description of the embodiment that the recording medium of the present invention is an optical disk 110. The optical disk may be a CD, CD-R, CD-RW, DVD-ROM, DVD-RAM, DVD-R, DVD-RW, or the like. The recording medium according to the present invention may be a magneto-optical disk such as an MO. Also, it may be a magnetic disk such as a hard disk.

The present invention also provides a program that cooperates with a computer for causing the computer to perform the functions of all or some of the means of the above-described data reproduction apparatus and method of the present invention.

Some means of the present invention represents some of these means or some functions of a single means.

The present invention also includes a computer-readable recording medium on which a program according to the present invention is recorded.

One aspect of the program according to the present invention may be an implementation that is recorded on a computer-readable recording medium and cooperates with a computer.

Another aspect of the program according to the present invention may be an implementation that is transmitted through a transmission medium, read by a computer, and cooperates with the computer.

The recording medium includes media such as ROM and the transmission medium includes a transmission mechanism such as optical fiber and the Internet, and light, a radio wave, and sound wave.

The above-described computer of the present invention is not limited to pure hardware such as CPU or the like. Instead, it may include firmware, an operating system, and peripherals.

The configuration of the present invention may be implemented by software or hardware.

INDUSTRIAL APPLICABILITY

As described above, the data reproduction apparatus of the present invention enables fast pull-in, optimum error correction, and stable reproduction in data reproduction involving a specific position, a seek, or a defect, even in the case where the quality of input data decreases.

The invention claimed is:

1. A data reproduction apparatus comprising:
reproduction means of reproducing data recorded in the recording medium;
clock count means of counting clocks based on the data reproduced from said recording medium;
window generation means of estimating the position of a synchronization signal in said reproduced data based on the count value of said clocks and generating a synchronization detection window signal having a predetermined width including the estimated position, wherein said window generation means detects said defect, and if the width of said window signal is changed, continues to change the width of said synchronization detection window signal for a predetermined period of time after the detection of said defect ends;
synchronization signal detection means of detecting the synchronization signal from the data reproduced from said recording medium by searching within said synchronization detection window; and
defect detection means of detecting a defect on said recording medium based on the data reproduced from said recording medium;
wherein said window generation means changes the width of said synchronization detection window signal at least for a period of time during which said defect is detected; and
wherein said window generation means detects said defect, and if the width of said window signal is changed, continues to change the width of said synchronization detection window signal for a predetermined period of time after the detection of said defect ends.

2. The data reproduction apparatus according to claim 1, wherein said defect detection means determines the type and/or size of said defect and said window generation means changes the quantity of a change in the width of said synchronization detection window signal according to said determined type and/or size of said defect.

3. The data reproduction apparatus according to claim 1, wherein said predetermined period of time is a time period from the completion of the detection of said defect to the time when said synchronization signal is detected with stability.

4. The data reproduction apparatus according to claim 1, wherein said synchronization signal detection means changes said criteria for detecting said synchronization signal according to the detection of said defect.

5. The data reproduction means according to claim 1, wherein said window generation means comprises a rewritable register and changes the width of said synchronization detection window signal by a width set in said register.

6. The data reproduction apparatus according to claim 1, wherein said defect detection means analyzes the envelope of an RF signal read from said storage medium to detect said defect.

7. A computer readable medium including instruction to cause a computer to perform a data reproduction method, the method comprising the steps of:

counting clocks based on the data reproduced from a recording medium;

estimating the position of a synchronization signal in said reproduced data based on the count value of said clocks;

generating a synchronization detection window signal having a predetermined width including the estimated position;

detecting the synchronization signal from the data reproduced from said recording medium by searching within said synchronization detection window; and detecting a defect on said recording medium based on the data reproduced from said recording medium;

wherein said generating step includes detecting said defect, changing the width of said synchronization detection window signal at least for a period of time during which said defect is detected, and if the width of said widow signal is changed, continuing to change the width of said synchronization detection widow signal for a predetermined period of time after the detection of said defect ends.

* * * * *